United States Patent
Houser et al.

(10) Patent No.: US 9,802,325 B2
(45) Date of Patent: Oct. 31, 2017

(54) ROBOTIC END EFFECTOR TOOL WITH ONE PIECE FIXED FRAME SYSTEM

(71) Applicant: Magna International Inc., Aurora (CA)

(72) Inventors: Tarner A. Houser, Sylvania, OH (US); Jeffrey S. Thompson, Perrysburg, OH (US); Robert R. Perez, Maumee, OH (US); Ryan M. Dwornik, Perrysburg, OH (US)

(73) Assignee: Magna International Inc., Aurora (CA)

( * ) Notice: Subject to any disclaimer, the term of this patent is extended or adjusted under 35 U.S.C. 154(b) by 665 days.

(21) Appl. No.: 14/380,271

(22) PCT Filed: Mar. 4, 2013

(86) PCT No.: PCT/US2013/028857
§ 371 (c)(1),
(2) Date: Aug. 21, 2014

(87) PCT Pub. No.: WO2013/131081
PCT Pub. Date: Sep. 6, 2013

(65) Prior Publication Data
US 2016/0082602 A1 Mar. 24, 2016

Related U.S. Application Data

(60) Provisional application No. 61/606,045, filed on Mar. 2, 2012.

(51) Int. Cl.
*B25J 15/00* (2006.01)
*B29C 33/20* (2006.01)

(52) U.S. Cl.
CPC ....... *B25J 15/0052* (2013.01); *B25J 15/0028* (2013.01); *B29C 33/20* (2013.01)

(58) Field of Classification Search
CPC . B29C 41/42; B29C 43/50; B29C 2043/5061; B29C 2043/5069;
(Continued)

(56) References Cited

U.S. PATENT DOCUMENTS

2005/0008469 A1* 1/2005 Jung .................... B25J 15/0052
414/729
2007/0023235 A1 2/2007 Nuchter et al.

FOREIGN PATENT DOCUMENTS

DE 36 25 037 A1 12/1994
FR 2 706 344 A1 1/1988

* cited by examiner

*Primary Examiner* — Timothy Kennedy
(74) *Attorney, Agent, or Firm* — Warn Partners, P.C.

(57) ABSTRACT

The present invention is directed to tool arrangement having a one piece frame. The one piece frame that is solid and non-adjustable and includes a back side, front side and one or more extension walls extending away from the front side of the one piece frame. An attachment portion is located on said back side of the one piece frame for connecting the tool arrangement to a robotic arm. The one piece frame has at least three mounting locations formed at predetermine locations on said one piece frame. The at least three mounting locations are predetermined and non-adjustable locations on the one piece frame. The tool arrangement includes a stationary gripper connected to one of the three mounting locations and at least one four point gripper connected to another one of the three mounting locations.

17 Claims, 7 Drawing Sheets

(58) Field of Classification Search
CPC . B29C 45/40; B29C 2045/4073; B29C 45/42; B29C 45/4225; B29C 2045/4266; B29C 51/44; B25J 15/0052; B25J 15/0028
See application file for complete search history.

ROBOTIC END EFFECTOR TOOL WITH ONE PIECE FIXED FRAME SYSTEM

This application is a National Stage of International Application No. PCT/US2013/028857, filed Mar. 4, 2013. This application claims priority to U.S. Provisional Patent Application No. 61/606,045 filed on Mar. 2, 2012. The disclosures of the above applications are incorporated herein by reference.

FIELD OF THE INVENTION

The present invention relates to a robotic end effector tool having a fixed frame system with predetermined gripper mount locations.

BACKGROUND OF THE INVENTION

The use of robotic arms for removing finished parts from moulds is known. Typically the robotic arm has a tool affixed to the end of the arm that has grippers that enter the mould, clamp onto and hold the part as the robotic arm pulls the finished part from the mould. The tool that is affixed to the end of the robotic arm is custom made using a multiple piece frame with various mounts for grippers. The frame piece, gripper mount locations and actual grippers are adjustable to allow the tool to be custom made and adjusted to determine the location where the finished part is grabbed by the grippers. Adjustments and tool design are carried out in the field using actual finished parts on the product line. As a result it takes several days to adjust and customize the tool and finished parts are destroyed as a result of grippers being place at poor locations and tearing the finished part as it is removed from the mold. Once the tool is setup the large number of components and adjustment points lead to problems during the life of the tool due to misalignment and loosening of the adjustment points. FIG. 1 is a prior art drawing of a conventional tool, which shows several pieces and adjustment points.

The grippers have two or three fingers that open and close by an actuation arrangement, typically a pneumatic or hydraulic actuator. There are two types of grippers that are used in conventional tools. First is a stationary gripper, which is mounted to the frame and configured to grab the finished part and pull the part away from the mould using the force provided by the robotic arm. The second type of gripper is called a slide gripper, which moves along a slide rail and grips and pulls the part using force generated by an actuator connected to the slide gripper. The sliding movement of the slide gripper is independent of the pulling force of the robotic arm. Both types of grippers use a two or three finger design, with each finger having a contact surface area with the finished part that is generally one-half inch, which can generate enough pressure to tear the finished part if the gripper is at a weaker location of the finished part. The conventional gripper design can also create tool design issues in applications where the grippers need to be located close to each other because the actuators of the grippers have housings that take up space on the tool frame, which results grippers having a minimum spacing.

As a result of the above conventional design, there is a need to provide an effector tool that is customized and engineered to have fewer components, accurate gripper placement and require little or no on-site trial and error adjustment. There is further a need to provide a tool that will not become misaligned or require adjustments to the frame of the tool. There is further a need to provide a tool that will not require trial and error adjustment, which results in finished parts being destroyed or damaged. There is further a need to provide a new gripper design that overcomes the minimum spacing design obstacles encountered with conventional gripper designs.

SUMMARY OF THE INVENTION

The present invention is directed to tool arrangement having a one piece frame. The one piece frame that is solid and non-adjustable and includes a back side, front side and one or more extension walls extending away from the front side of the one piece frame. An attachment portion is located on said back side of the one piece frame for connecting the tool arrangement to a robotic arm. The one piece frame has at least three mounting locations formed at predetermine locations on said one piece frame. The at least three mounting locations are predetermined and non-adjustable locations on the one piece frame. The tool arrangement includes a stationary gripper connected to one of the three mounting locations and at least one four point gripper connected to another one of the three mounting locations.

BRIEF DESCRIPTION OF THE DRAWINGS

The present invention will become more fully understood from the detailed description and the accompanying drawings, wherein.

DETAILED DESCRIPTION OF THE INVENTION

Figure 1:
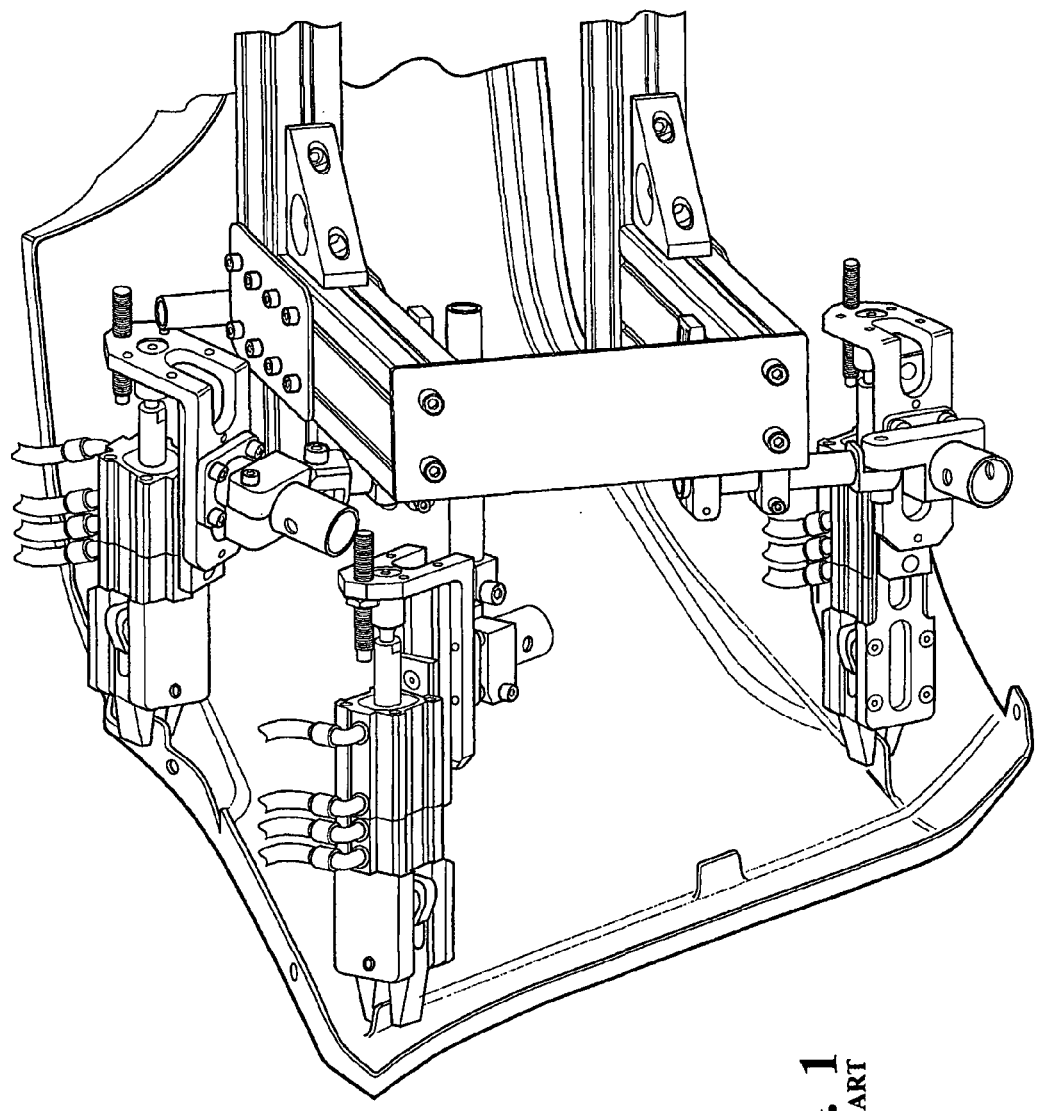
FIG. 1 is a sectional side perspective view of a prior art tool gripping a formed part.
Figure 2:
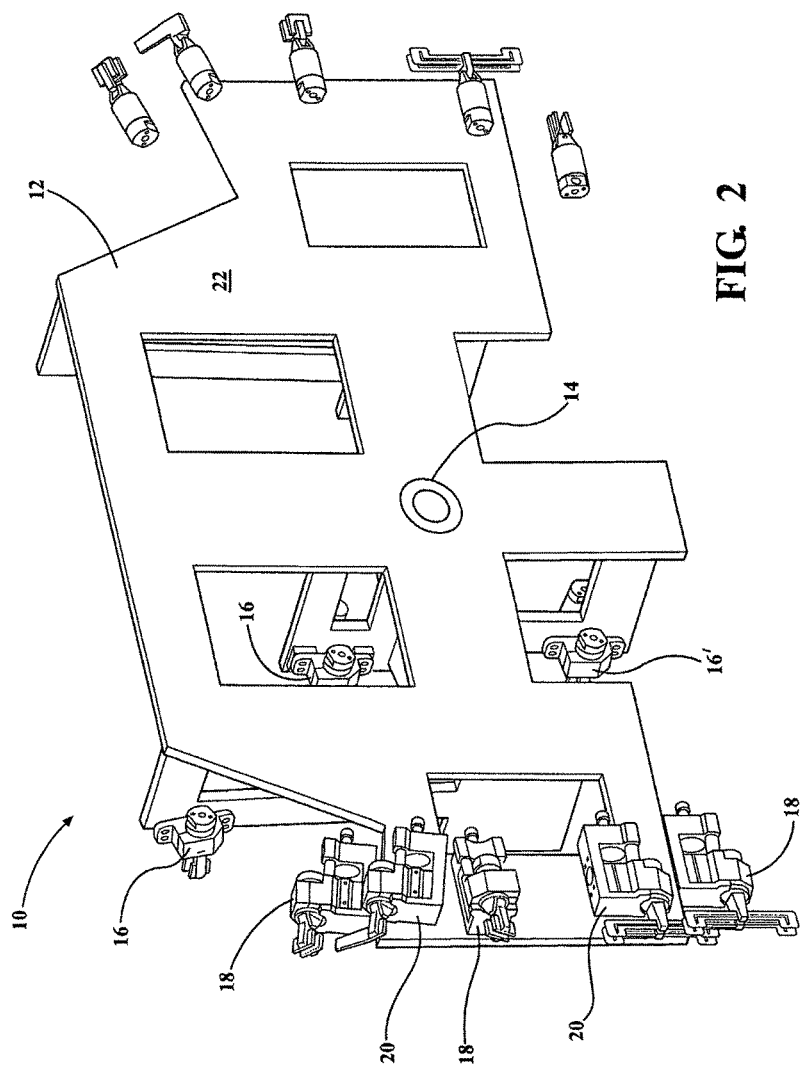
FIG. 2 is a rear perspective view of a tool arrangement in accordance with one aspect of the present invention.
Figure 3:
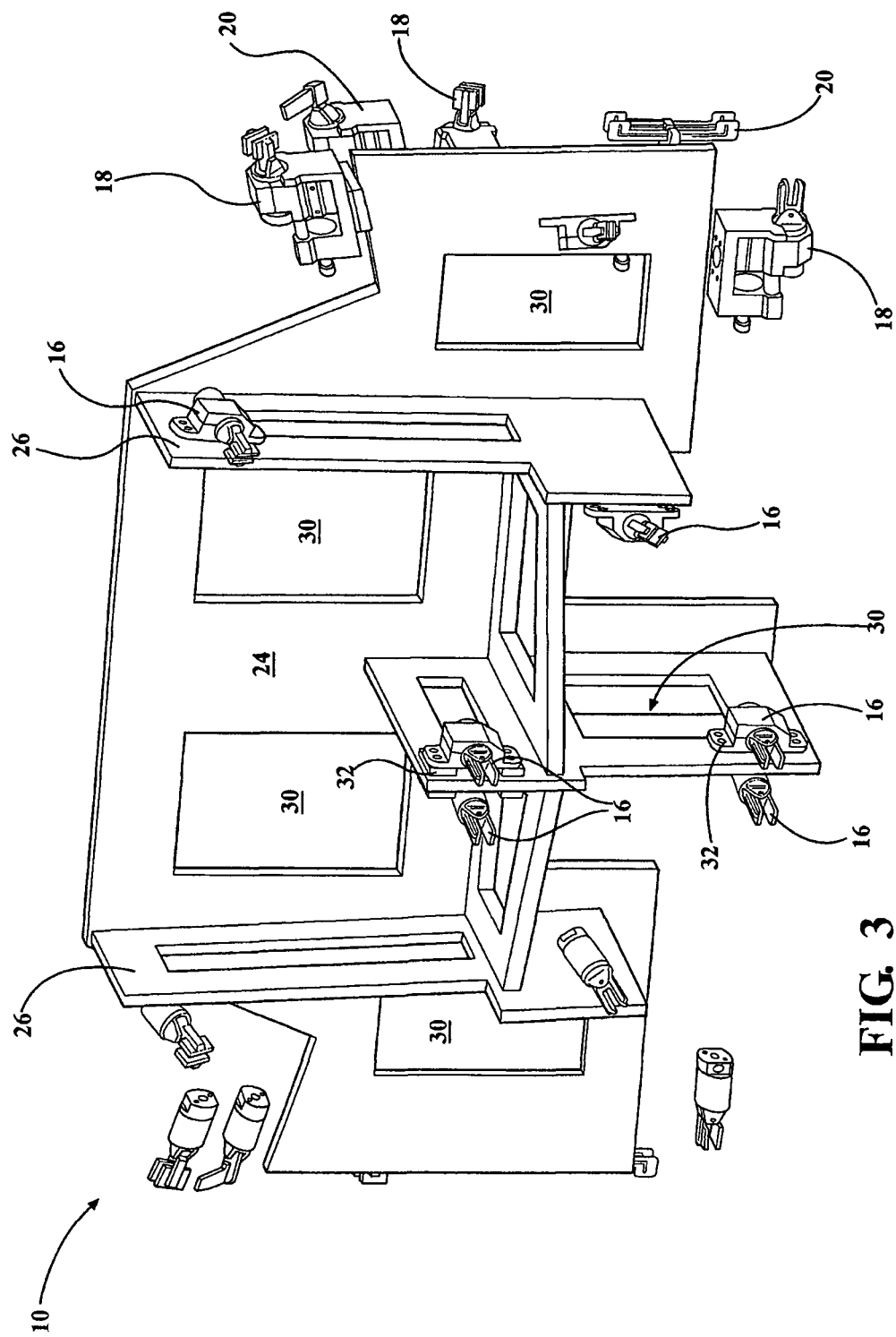
FIG. 3 is a front perspective view of the tool arrangement in accordance with one aspect of the present invention.

The following description of the preferred embodiment(s) is merely exemplary in nature and is in no way intended to limit the invention, its application, or uses.

Referring now to FIGS. 2, 3 6 and 7, a tool arrangement 10 in accordance with one embodiment of the present invention is shown. The tool arrangement 10 has a frame 12 that is a one piece structure formed of metal or plastic. The frame 12 has a rear side 22, front side 24 and extension walls 26 extending from the front side 24. An attachment point 14 is located on the rear side 22 for connecting the frame 12 to a robotic arm. The attachment point 14 can be a connector flange using suitable fasteners. The frame has a number of different windows 30 that are used for providing access and power to the grippers that are mounted to the frame as discussed below. The windows 30 also reduce the weight of the frame 12. The rear side 22 and front side 24 also have L-shaped and triangular shaped support brackets 28 that provide support to the rear side 22, front side 24 and extension walls 26 of the frame by created boxed structures that add to the rigidity of the frame 12.

The frame 12 once machined is a solid single piece structure that is non-adjustable. The frame also has several mounting locations 32 machined thereon for mounting various grippers, which will be described in greater detailed below. The mounting locations 32 are machined into the frame 12 and are also non-adjustable. The non-adjustability of the frame 12 and mounting locations 32 is an improvement over the prior art designs, which create a frame and mounting locations using several different components having several adjustment points.

Each mounting location 32 on the frame 12 is configured to receive a gripper. The present invention uses three types of grippers, a stationary gripper 16, slide gripper 18 and four point gripper 20 and it is within the scope of this invention for variations of these grippers to be implemented in accordance with the present invention. The type of gripper mounted at a specific mounting location 32 depends on where the gripper will be positioned when gripping the finished part, which is generally referred to herein as a grip point. Each grip point will have different characteristics such as location within the mould, material thickness, surface area; flex modulus and tensile strength, which can depend on the material used to make the finished part. The amount of force exerted on a specific grip point can cause stress to the finished part. Some stress can be absorbed and not harm the part, while too much stress can damage or destroy the finished part as when removed from the mould cavity in an improper manner.

Figure 5:
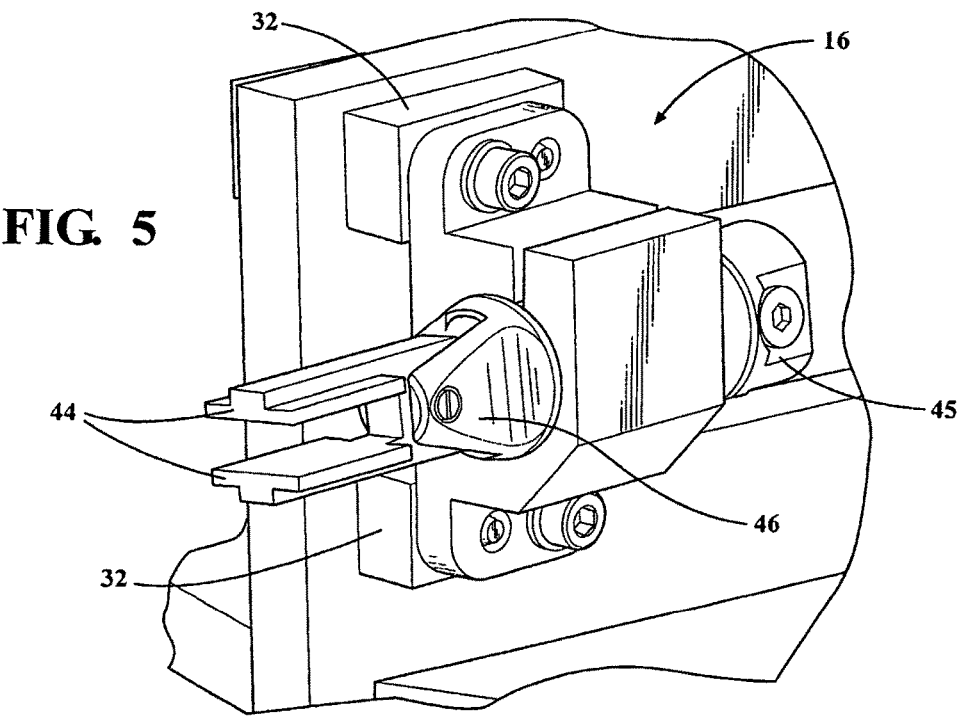
FIG. 5 is an enlarged side perspective view of a stationary gripper.
Figure 6:
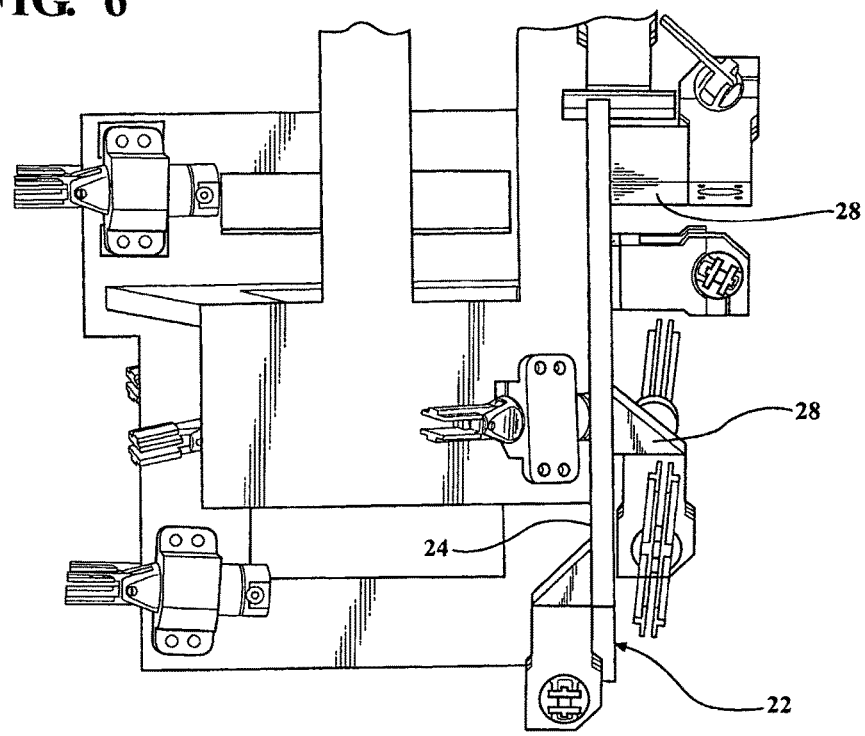
FIG. 6 is a sectional plan overhead view of the tool arrangement in accordance with one aspect of the present invention.

Referring now to FIG. 5, a single stationary gripper 16 is shown. The stationary gripper 16 is mounted to a mounting location 32 on a frame using fasteners. The stationary gripper 16 is not adjustable and does not move relative to the frame 12 except to for the fingers 44 that move about a pivot 46 between a clamped and un-clamped position. The movement of the fingers 44 is controlled by an actuator 45, which is a pneumatic, hydraulic or gear driven actuator. The tool arrangement 10 as shown in the present invention has several stationary grippers 16; however, it is within the scope of this invention for a greater or lesser number of stationary grippers 16 to be implemented. The stationary gripper 16 like the one shown in FIG. 5 is generally located on the frame 12 at a location that does not require movement of the stationary gripper 16 relative to the frame 12 during the operation of removing the a finished part from a mould cavity. The stationary gripper 16 is used to grab onto and hold a part at a specific location and then the force of the robotic arm pulling the frame 12 out of the mould cavity 12 is transferred to the stationary gripper 16 in order to move the finished part out of the mould cavity.

Figure 4:
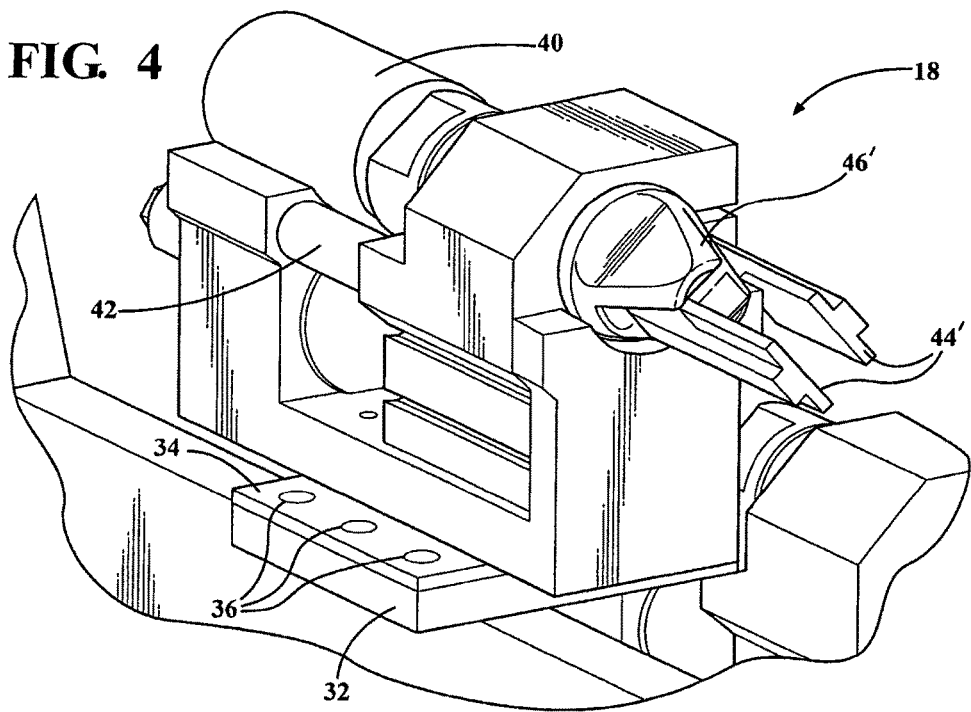
FIG. 4 is an enlarged side perspective view of a slide gripper.

Referring now to FIG. 4, a single slide gripper 18 is shown. The slide gripper 18 is mounted to a mounting location 32 on the frame 12 using fasteners extending through locator pin holes 36 drilled through a slide mounting plate 34. The slide gripper 18 has fingers 44' that move about a pivot 46' between a clamped and un-clamped position. The movement of the fingers 44' is controlled by an actuator 40, which is a pneumatic, hydraulic or gear driven actuator. The slide gripper 18 is moveable relative to the frame 12 using a slide rail 42 that moves the fingers 44' between a retracted position and extended position. This allows the fingers 44' to pull on a finished part without relying on force from the robotic arm. The tool arrangement 10 as shown in the present invention has several slide grippers 18; however, it is within the scope of this invention for a greater or lesser number of slide grippers 18 to be implemented.

Figure 8:
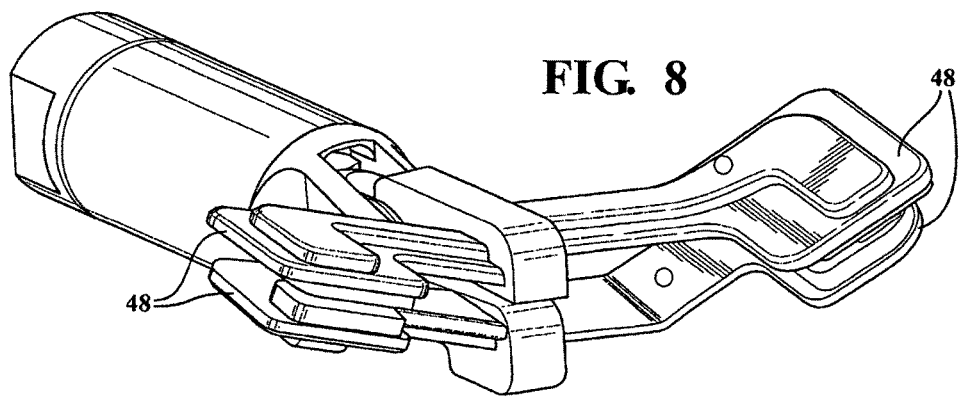
FIG. 8 is a side perspective view of a four point gripper in accordance with another aspect of the present invention.
Figure 7:
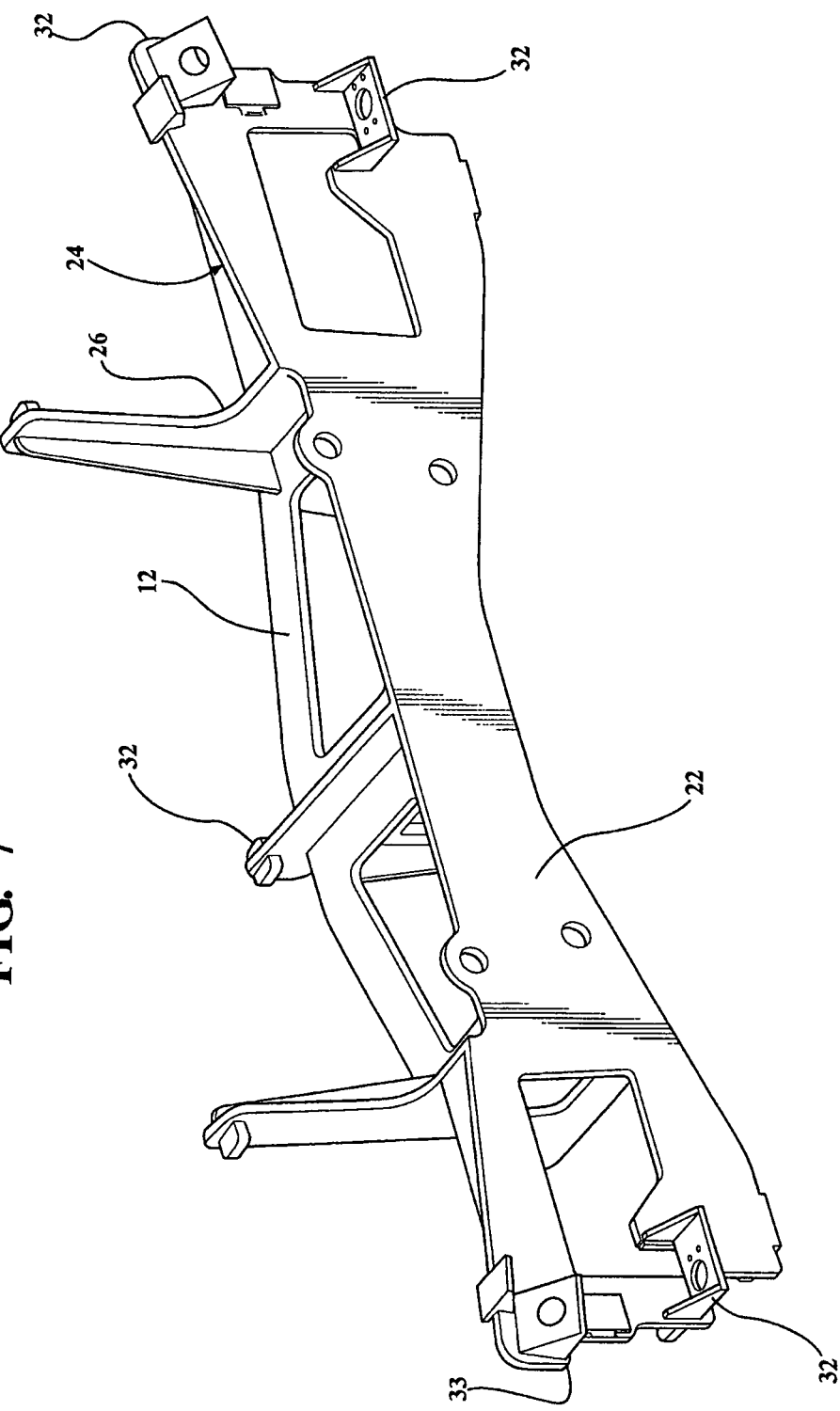
FIG. 7 is a rear perspective view of a frame of the tool arrangement having the grippers removed.

Referring now to FIG. 8 another aspect of the present invention is shown, which includes a four point gripper 20. The fingers 44, 44' of the stationary gripper 16 and slide gripper 18 described above have two fingers that are generally about one-half inch wide with two points of contact, that grip the finished part. The four point gripper 20 has four point fingers 48 configuration that provides a four points of contact and a grip surface that is greater than one half inch. The four point fingers cover a greater surface area and spread the grip load asserted on a finished part over the greater surface area. This provides an advantage of putting less strain on the grip point on the finished part and providing a wider more even grip when pulling the finished part away from the mould cavity. The four point gripper 20 can be used as either a stationary gripper or slide gripper as described above with reference to FIGS. 4 and 5. Additionally the four point gripper 20 can be used in locations where it would be otherwise necessary or desirable to have two point grippers located side-by-side each other or in close proximity, but could not due to the spatial constrains of the gripper actuators.

Figure 9:
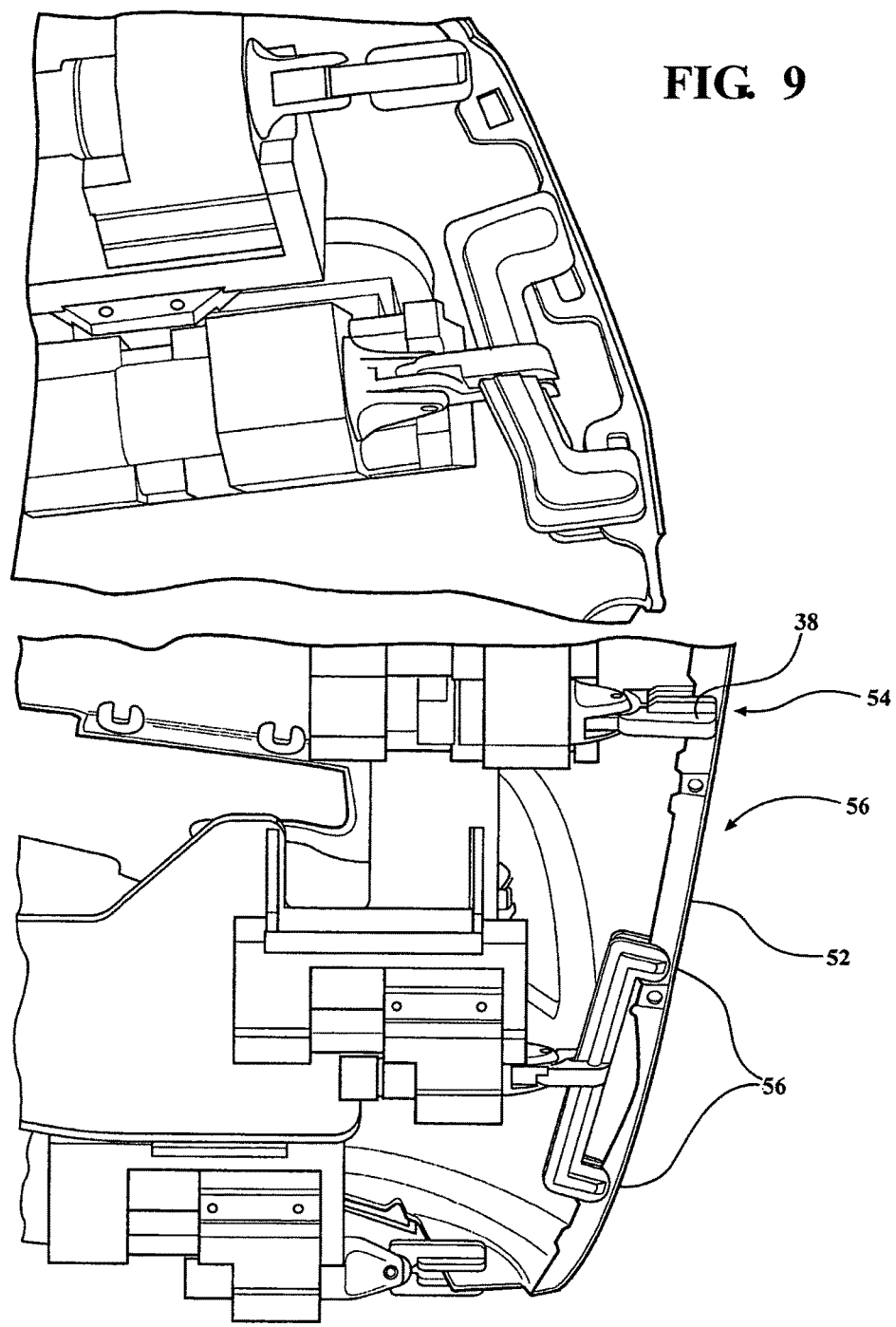
FIG. 9 is an exploded rear view of the tool arrangement gripping onto a finished part in accordance with one aspect of the present invention.

Referring now to FIG. 9, the tool arrangement 10 in the present invention generally operates in the following manner. The fingers 38 of the stationary grippers 16, and slide grippers 18 and the four point fingers 48 of the four point grippers 20 are all moved to the open position. The sliding grippers 18 and four point grippers 20 are moved to a retracted position.

Once a finished part has been created in a mould cavity the mould cavity is opened to expose the finished part. A robotic arm connected to the attachment 14 on the frame 12 of the tool arrangement 10 moves the tool arrangement into the mould cavity so that the various grippers 16, 18 and 20 are positioned near predetermined grip points 54, 56 on the finished part 50. The slide grippers 18 and four point grippers 20 slide to the extended position and then all of the grippers 16, 18, 20 clamp down on the grip points 54, 56 of the finished part. Then the slide grippers 18 and four point grippers slide to the retracted position to pull the finished part 50 inward to release the finished part from the walls of the mould cavity. The tool arrangement 10 is then pulled out of the cavity by the robotic arm. The force of the robotic arm pulling the tool arrangement is transferred to the stationary grippers 16, which move with the frame 12 to finish removing the finished part 50 from the mould cavity. Once the finished part 50 is outside of the mould cavity the slide grippers 18 and four point grippers 20 move from the retracted position to the extended position to the finished part bends back to the finished position. All of the grippers 16, 18 and 20 are then moved to an unclamped position so the finished part 50 is removed from the tool arrangement 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tool arrangement comprising:
   a one piece frame having a back side, front side and one or more extension walls extending away from the front side of the one piece frame, wherein said one piece frame is a solid non-adjustable frame;

an attachment portion on said back side of said one piece frame for connecting said tool arrangement to a robotic arm;

at least three mounting locations formed at predetermine locations on said one piece frame, wherein each of said at least three mounting locations are predetermined and non-adjustable locations on said one piece frame;

a stationary gripper connected to one of said at least three mounting locations; and at least one four point gripper connected to a second one of said at least three mounting locations.

2. The tool arrangement of claim 1 wherein said one piece frame has a plurality of windows formed through said one piece frame for reducing weight and providing access to said at least three mounting locations.

3. The tool arrangement of claim 1 further comprising a third gripper connected to a third one of said at least three mounting locations, wherein said third gripper is one selected from the group comprising a stationary gripper, a slide gripper and a four point gripper.

4. The tool arrangement of claim 1 wherein said stationary gripper is not adjustable and does not move relative to said one piece frame except for fingers on said stationary gripper that move about a pivot between a clamped and un-clamped position.

5. The tool arrangement of claim 4 wherein the movement of said fingers is controlled an actuator which can be one selected from the group comprising a pneumatic, hydraulic or gear driven actuator.

6. The tool arrangement of claim 1 further comprising a slide gripper connected to a third one of said at least three mounting locations, wherein said slide gripper has fingers that move about a pivot between a clamped position and an unclamped position and said slide gripper is connected to a slide rail allowing said slide gripper to move relative to said frame on said slide rail between a retracted position and an extended position.

7. The tool arrangement of claim 1 wherein said rear side and said front side of said one piece frame further include L-shaped and triangular shaped support brackets to create box structures for adding rigidity to said one piece frame.

8. The tool arrangement of claim 1 wherein said four point gripper has four point fingers that provide four points of contact between said four point gripper and a grip surface on a part, wherein said four points of contact provide a grip surface on said part that is greater than one-half inch.

9. A tool arrangement comprising:
a one piece frame having a front side, a back side, and one or more extension walls extending away from the front side of the one piece frame and L-shaped and triangular shaped support brackets that provide support to the rear side, front side and one or more extension walls in order to create boxed structures of the one piece frame, wherein said one piece frame is a solid non-adjustable frame;

at least three mounting locations formed at predetermined locations on said one piece frame, wherein each of said at least three mounting locations are predetermined and non-adjustable locations on said one piece frame;

a plurality of windows formed through said one piece frame for reducing weight and providing access to said at least three mounting locations; and one gripper connected to each of said at least three mounting locations on said one piece frame, wherein said one gripper is one selected from the group comprising a stationary gripper, a slide gripper and a four point gripper and combinations thereof.

10. The tool arrangement of claim 9 further comprising a third gripper connected to a third one of said at least three mounting locations, wherein said third gripper is one selected from the group comprising a stationary gripper, a slide gripper and a four point gripper.

11. The tool arrangement of claim 9 wherein said stationary gripper is not adjustable and does not move relative to said one piece frame except for fingers on said stationary gripper that move about a pivot between a clamped and un-clamped position.

12. The tool arrangement of claim 11 wherein the movement of said fingers is controlled an actuator which can be one selected from the group comprising a pneumatic, hydraulic or gear driven actuator.

13. The tool arrangement of claim 9 further comprising a slide gripper connected to a third one of said at least three mounting locations, wherein said slide gripper has fingers that move about a pivot between a clamped position and an unclamped position and said slide gripper is connected to a slide rail allowing said slide gripper to move relative to said frame on said slide rail between a retracted position and an extended position.

14. The tool arrangement of claim 9 wherein said four point gripper has four point fingers that provide four points of contact between said four point gripper and a grip surface on a part, wherein said four points of contact provide a grip surface on said part that is greater than one-half inch.

15. A method of using a tool arrangement mounted to a robotic arm for removing a finished part from a mold cavity comprising the steps of:
providing a one-piece tool arrangement having a back side, front side and one or more extension walls extending away from the front side of the one piece frame, wherein said one piece frame is a solid non-adjustable frame and includes an attachment portion on said one piece frame for connecting said one piece frame to a robotic arm;

providing at least three mounting locations formed at predetermined locations on said one piece frame, wherein each of said at least three mounting locations are predetermined and non-adjustable locations on said one piece frame;

providing at least one stationary gripper connected to one of said at least three mounting locations;

providing at least one four point gripper connected to a second one of said at least three mounting locations, and providing at least one slide gripper mounted on a third one of said at least three mounting locations, wherein said third one of said at least three mounting locations is slidably connected to a rail connected to said one piece frame;

providing a mold cavity movable between an open and closed position and including a finished part;

closing said mold cavity and forming a finished part;

opening said mold cavity to expose said finished part;

moving said robotic arm with said one piece frame connected to an end of said robotic arm toward a mold cavity so said one piece frame moves into said mold cavity positioning said stationary gripper, said slide gripper and said four point gripper are near predetermined grip points on said finished part;

moving said slide gripper and said four point gripper into an extended position;

moving said stationary gripper, said slide gripper and said four point gripper to the claimed position on said grip points of said finished part; and moving said slide gripper and four point grippers to a retracted position, thereby pulling said finished part inward to release the finished part from the mold cavity.

16. The method of claim 15 further comprising the step of:

operating said robotic arm to move said one piece tool arrangement out of said mold cavity with said finished part connected to said one piece tool arrangement, wherein the force of the robotic arm pulling the one piece tool arrangement is transferred to the stationary grippers, which move with the frame to finish removing the finished part from the mold cavity.

17. The method of claim 16 further comprising the steps of:

sliding said gripper and said four point gripper from the retracted position to the extended position once said finished part is outside of said mold cavity;

moving said stationary gripper, said slide gripper and said four point gripper to the unclamped position to allow removal of the finished part from the tool arrangement.

* * * * *